Aug. 7, 1945.  C. L. FELDTKELLER  2,381,153
TRANSFER MECHANISM FOR GRID PANELS
Original Filed Oct. 16, 1943   2 Sheets-Sheet 1

INVENTOR.
CARL L. FELDTKELLER.
BY
Carlsen & Hagle
ATTORNEYS

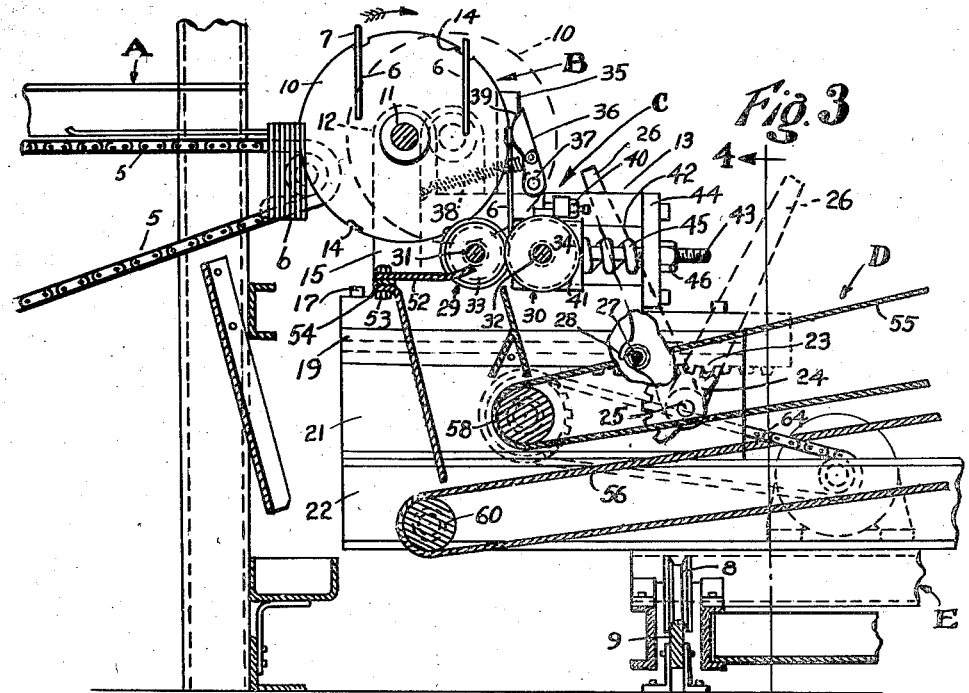
Aug. 7, 1945.  C. L. FELDTKELLER  2,381,153
TRANSFER MECHANISM FOR GRID PANELS
Original Filed Oct. 16, 1943   2 Sheets-Sheet 2
INVENTOR.
CARL L. FELDTKELLER
BY
ATTORNEYS Patented Aug. 7, 1945

2,381,153

UNITED STATES PATENT OFFICE 2,381,153

TRANSFER MECHANISM FOR GRID PANELS

Carl L. Feldtkeller, Milwaukee, Wis., assignor to Solar Corporation, Milwaukee, Wis., a corporation of Delaware Original application October 16, 1943, Serial No. 506,590. Divided and this application June 19, 1944, Serial No. 541,015

14 Claims. (Cl. 164—61)

This invention relates to the art of making plates for storage batteries and the primary object is to provide a simple, practical and efficient mechanism for transferring grid panels, each of which comprises two interconnected grid plates, from any one of a series of curing conveyors to a parting mechanism wherein the plates are separated from each other.

The present application is a division of my copending parent application for Apparatus and method for preparing battery plates, Serial No. 506,590, filed October 16, 1943. Reference to this application is invited for a more complete understanding of the entire apparatus in connection with which the present invention is or may be employed.

In the accompanying drawings which illustrate a preferred embodiment of the invention—

Fig. 3 is an enlarged vertical and longitudinal section along the line 3—3 in Fig. 1.

Fig. 4 is an enlarged vertical cross section along the line 4—4 in Fig. 3.

Figure 1:
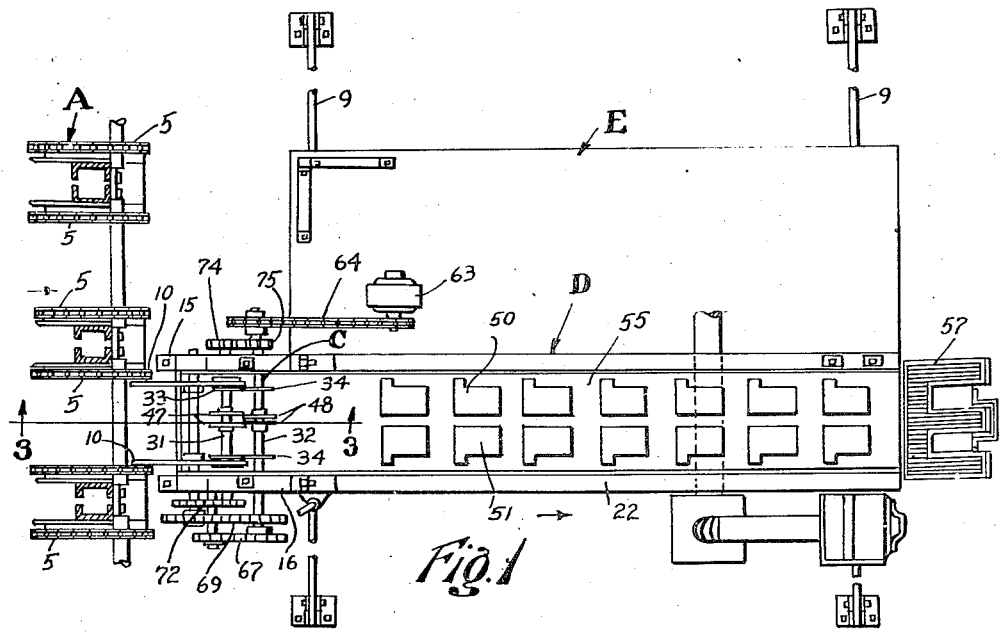
Fig. 1 is a plan view, partially in horizontal section, showing the delivery ends of several curing conveyors, the transfer mechanism of the present invention, and the supporting frame and conveyors associated therewith.

Referring to the drawings more particularly and by reference characters, A designates generally a series of curing conveyors, only the delivery ends of which are here shown, and each of which comprises two spaced endless conveyor chains 5 upon which the grid panels 6 may be supported by their lugs 7, which hang upon the chains. The transfer mechanism of the present invention is designated generally at B and the same is associated with a parting or cutting mechanism C, a conveyor mechanism D and a platform E.

As pointed out in detail in my parent application hereinbefore identified, the grid panels 6, after being pasted, are placed upon the curing conveyors A and are there permitted to cure before delivery to the parting mechanism C. In the manufacturing process the curing conveyors A are loaded one at a time and the conveyors are then unloaded after the panels have been cured for any desired length of time. To unload the conveyors after the panels are cured the transfer mechanism B is shifted from one to the other as required, and for this purpose the platform E is supported by rollers 8 upon rails 9 so that the entire assembly of the elements B, C, D, and E may be shifted transversely across the delivery ends of the conveyors to permit the alignment of the transfer mechanism within a selected conveyor.

The transfer mechanism B comprises a pair of circular disks 10 which are spaced and arranged to enter between and overlap the delivery ends of any adjacent pair of conveyor chains 5. The transfer disks 10 are carried upon a shaft 11 which is journaled at its ends in bearings 12 forming a part of a carriage designated generally at 13. The margins of the disks have regularly spaced notches 14 and when the disks are rotated in the direction indicated by the arrow in Fig. 3 these notches 14 will engage and pick up one panel 6 at a time by its lug 7 and will carry the panels in a suspended position upwardly and outwardly away from the conveyor chains 5.

The transfer mechanism carriage 13 comprises similar side members 15 and 16 disposed in parallel positions outwardly of the disks 10 and these side members are secured by bolts 17 through their base flanges 18 to slides 19 which are grooved as indicated at 20 to slidably engage the edges of a pair of base channels 21. The channels 21 are secured rigidly to similar but longer base channels 22 forming a part of the conveyor mechanism D and the slides 19 thus support the carriage 13 for movement in opposite endwise directions toward and away from the conveyors A. The purpose of such movements will be presently set out.

One of the slides 19 has an underside provided with gear teeth or a gear rack 23 and meshing therewith is a gear segment 24 carried upon a shaft 25 journaled through the adjacent sub-base channel 21. At its outer end the shaft 25 is provided with a hand lever 26 by which the shaft and the gear segment 24 may be oscillated to shift the carriage 13 back and forth as described. A stop screw 27 is provided on the side of the channel 21 to engage a notch 28 in the hand lever 26 when the same is moved forward to shift the carriage 13 toward the conveyors A, and said screw may be tightened if desired to lock the carriage in this position and to prevent any displacement thereof due to vibration or other causes.

The parting mechanism C is also supported upon the carriage 13 and is movable therewith as a unit with transfer mechanism B, said parting mechanism C comprising a pair of parting rolls or members, designated generally at 29 and 30, which form the male and female portions of a die and which are journaled in parallelism transversely between the carriage side members 15 and 16. Said members 29 and 30 are carried in this position by their shafts 31 and 32 and include end disks 33 and 34 fixed on the respective shafts. These disks are disposed with their adjacent surfaces immediately beneath the delivery or downwardly moving sides of the transfer disks 10 in such manner that the panels, as they are carried by the disks 10 will be lowered edgewise between and engaged by disks 33 and 34 to be moved downward thereby. To guide the panels in such downward entrance to and between the disks 33 and 34 I provide first the lateral guides 35 supported upwardly from the carriage side members 15 and 16 outside of the disks 10 to engage the ends of the panel lugs 7 and so center the panels with respect to the parting members 29 and 30. In addition, I also provide holding fingers or dogs 36 disposed edgewise and tangentially with respect to the edges of the transfer disks 10 and which fingers are pivoted at their lower ends at 37 on the carriage side members 15 and 16. Retractile coil springs 38 are arranged to pull said fingers 36 toward the disks 10 causing the curved guide surfaces 39 of the fingers to engage the upper corners of the panels 6 and hold the lugs thereon from disengagement from the notches 14 at these points. The movement of the fingers 36 under influence of the springs 38 is adjustably limited by conventional stop screws 40 to thus adjust the clearance between the fingers and disks, but it will be apparent that the fingers will move back clear of the disks against the tension of the springs 38 should an obstruction occur during operation.

The disks 33 and 34 move downwardly on adjacent peripheral surfaces and as they engage the lower ends of the panels 6 descending from the transfer disks 10 they will feed the panels downwardly entirely through and between the parting members. The panels are urged downwardly by the disks 33 and 34 to initiate such feeding movement by the pulling engagement of the notches 14 with the lugs on the panels, as will be clearly evident in Fig. 3.

The parting member 30 has its shaft 43 carried in slide bearings 41 which are slidable in slots or ways 42 formed in the carriage side members 15 and 16. Studs 43 are extended from the bearings 41 slidably through apertured end plates 44 which close the ends of the slots 42, and heavy coil springs 45 are arranged on the studs 43 to yieldably urge parting member 30 toward parting member 29. A nut 46 on each stud 43 permits spacing adjustments between the parting members in an obvious manner, and the springs 45 permit the parting members to spread apart should an obstruction occur.

The parting member 29 has a pair of spaced center shearing disks 47, while the member 30 has a complementary pair of shearing disks 48 which enter between in shearing relation with disks 47 as the members 29 and 30 are rotated. As best indicated in Fig. 4 the shearing disks 47 and 48 are adjustable as to spacing by means of hubs threaded on the shafts 31 and 32, and the center disks 47 and 48 are so spaced and located that they will shear the center strip 49 from the grid panels 6 as they pass between the disks thus separating each grid panel into its respective plates 50 and 51, indicated in Fig. 1. The separated plates will drop between the disks as they clear while the center strips 49 will be stripped from between disks 47 by a stripper plate 52 disposed tangentially toward shaft 31 so that the strips will drop clear. Said stripper plate 52 is secured, as indicated at 53, to a cross member 54 connecting the carriage sides.

Figure 2:
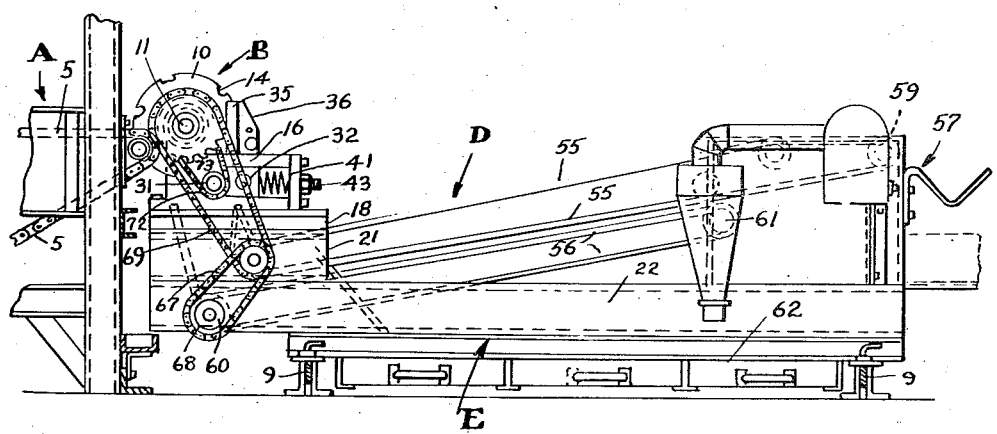
Fig. 2 is a side elevation of the structure as shown in Fig. 1.

The conveyor mechanism D comprises two separate superimposed conveyor belts 55 and 56, and the upper one 55 carries away the separated plates 50 and 51 and delivers them to a receptacle designated generally at 57 in Figs. 1 and 2, while the lower one 56 carries off the severed center strips 49. The conveyor belt 55 is trained over rollers 58 and 59 while conveyor belt 56 is trained over similar rollers 60 and 61. The severed center strips carried by conveyor belt 56 fall from the delivery end of the belt into a drawer 62 from which they are collected at intervals for remelting.

Inasmuch as this conveyor structure forms no part of the present invention, it will not be detailed further herein.

The transfer mechanism B, parting mechanism C and conveyor mechanism D are all driven from a common electric motor 63 which is mounted on the platform E and primarily drives the conveyor rollers 58 through a sprocket chain 64. At the other end the conveyor roller 58 operates a pair of sprocket gears 65 and 66, and the latter is connected by sprocket chain 67 to another sprocket gear 68 for driving the roller 60 of the lower conveyor belt 56. Over the sprocket 65 is trained a sprocket chain 69 running over a sprocket gear 70 secured to the shaft 11 for operating the transfer disks 10. A sprocket gear 71 is also provided on the shaft 11 and operates a sprocket chain 72 running over a sprocket gear 73 on the shaft 31 for rotating the parting member 29. A pair of gears 74 and 75 connect the shafts 31 and 32 causing the parting member 29 to rotate parting member 30 in an opposite direction as required for proper operation.

In operation the transfer disks 10 are positioned inwardly between any adjacent pair of conveyor chains 5 and operate to strip the grid panels one at a time therefrom and deliver the panels to the parting mechanism as has been described. It will be understood of course, that during the unloading operation the conveyor chains 5 are operated to continuously feed the grid panels toward the transfer disks 10 and the unloading operation takes place as fast as the disks remove the panels from the chains. When one conveyor A has thus been unloaded the entire assembly B, C, D, and E is shifted transversely with respect to the delivery ends of the conveyors A to thus align the transfer mechanism B with another of said conveyors, and such shifting movement is obviously provided by the mounting of the platform E upon the rails 9.

Inasmuch as the transfer disks 10, while in operation, overlap the conveyor chains 5 it is necessary that they be retracted therefrom in order to clear the chains while being shifted to a different conveyor. For this purpose the hand lever 26 is grasped and pulled back, causing the gear segment 24 and rack 23 to slide the carriage 13 endwise away from the conveyors. The disks 10 then substantially clear the chains 5 as indicated by the dotted lines shown in Fig. 3. When the structure is then shifted to the next conveyor the return movement of the hand lever 26 will move the transfer disks 10 into operative relationship with the new conveyor and the transfer mechanism may be located in this position by adjustment of the screw 28.

It is obvious that for proper delivery of the grid panels by the transfer disks 10 and the parting members 29 and 30 these parts must be maintained in a definite operative relationship. Inasmuch as both disks 10 and the parting members 29 and 30 are wholly supported by the side members 15 and 16 of the carriage 13 they move as a unit while the transfer mechanism is retracted for movement to a position without in any way disturbing this operative relationship.

It is understood that suitable modifications may be made in the construction and details of the machine, as thus described, without departing from the spirit and scope of the appended claims. Having now therefore fully disclosed my invention, what I claim to be new and desire to protect by Letters Patent is:

1. In combination, a plurality of grid panel conveyors, a grid panel parting mechanism, means for shifting the parting mechanism to alignment with any selected conveyor to receive panels therefrom, and a transfer mechanism for transferring panels from any selected conveyor to the parting mechanism, said transfer mechanism being supported on the parting mechanism for position adjustment therewith and being also retractably adjustable with respect to the conveyors to clear the same as the parting mechanism is shifted to receive panels from one to another thereof.

2. The combination with a series of conveyors for delivering grid panels, a frame supporting a parting machine and shiftable across corresponding ends of the conveyors to selectively receive panels from any one of said conveyors, of a transfer mechanism supported on the parting machine for shifting adjustment therewith to position for transferring panels from any selected conveyor to the parting machine, and the said transfer mechanism and parting machine being also adjustably supported on the frame for movement away from one conveyor while being shifted to another.

3. The combination with a series of parallel conveyors adapted to deliver grid panels at one end, of a frame and a parting mechanism thereon adapted to receive panels from the conveyors, means for shifting the frame and parting mechanism to bring the latter into receiving position with respect to any one of the conveyors, and a transfer mechanism supported for shifting adjustment with said parting mechanism and operative to transfer panels from any selected conveyor to the parting mechanism, said transfer mechanism and parting mechanism being also supported for retraction movement to an inoperative position while they are shifted from one conveyor to another.

4. In combination, a frame supporting a series of conveyors adapted to deliver grid panels at one end, another frame supporting a parting mechanism to receive and operate upon the panels received from the conveyors, and a transfer device for transferring grid panels from the conveyors to the said parting mechanism, the said transfer device being slidably supported with respect to one frame for adjustment toward and away from the other frame, and for movement into an inoperative position whereby one of said frames may be adjusted with respect to the other.

5. In an apparatus of the character described, a series of curing conveyors, a frame supporting a parting mechanism and movable to position said parting mechanism for receiving grid panels, selectively, from any one of the curing conveyors, a transfer mechanism supported by said frame and movable therewith into alignment and overlapping relation with any one of the conveyors for transferring panels therefrom to the parting mechanism, and means adjustably mounting said parting transfer mechanism on the frame including slidable members whereon said transfer mechanism may be retracted from said overlapping relation with the conveyors as the frame is moved.

6. In combination, a frame supporting a series of conveyors adapted to deliver articles at one end, another frame supporting a parting mechanism to receive and operate upon articles received from the conveyors, and a transfer device for transferring articles from the conveyors to the said parting mechanism, the said transfer device and said parting mechanism being slidably supported on the frame and movable as a unit toward and away from the conveyors whereby said transfer device may be moved to an inoperative position to permit the frames to be adjusted with respect to each other.

7. In an apparatus of the character described, a plurality of conveyors having delivery ends extending in a common direction, a frame shiftable across the delivery ends of the conveyors, a parting mechanism on the frame, a transfer mechanism on the parting mechanism and operative to transfer articles from any one of the conveyors to said parting mechanism as the frame is shifted to align the transfer mechanism with a selected conveyor, said transfer mechanism having a definite operative position with respect to the parting mechanism for properly delivering articles thereto, and said transfer and parting mechanisms being movable as a unit on the frame to move the transfer mechanism to an inoperative position with respect to the conveyors as it is shifted from one to another thereof without disturbing said operative relationship between the transfer and parting mechanisms.

8. In an apparatus of the character described, a plurality of grid panel conveyors each comprising a pair of spaced conveyor chains, a frame supported for position adjustment with respect to the several conveyors, a parting mechanism on the frame, a transfer mechanism comprising spaced power operated transfer disks adapted in response to position adjustment of the frame to be arranged in overlapping relation to any pair of conveyor chains to transfer panels therefrom to said parting mechanism, said transfer disks having a necessary fixed operative relationship with the parting mechanism to deliver panels thereto, and said parting and transfer mechanism being operatively arranged for movement as a unit on the frame to retract the transfer disks from said overlapping relationship with the conveyor chains during position adjustment of the frame without altering the operative relationship between the disks and parting mechanism.

9. In an apparatus of the character described, a series of conveyors, a frame supported for adjustment into alignment with any selected conveyor, a parting mechanism and a transfer mechanism for transferring grid panels from any one of said conveyors to said parting mechanism, said parting and transfer mechanisms being assembled in a carriage structure slidably supported on the frame for movement toward and away from the conveyors, and means for moving said carriage to adjust said transfer mechanism into an inoperative position while the frame is adjusted to alignment with a selected conveyor.

10. In an apparatus of the character described, a frame supported for positive movement in one direction to any one of a plurality of feed means, a parting mechanism, a transfer mechanism, a carriage comprising side members between which said parting and transfer mechanisms are operatively arranged and supported, and said side members being slidably mounted on the frame for adjustment in a direction at right angles to that in which said frame is adjustable.

11. In an apparatus of the character described, a frame supported for positive movement in one direction to any one of a plurality of feed means, a transfer mechanism and a parting mechanism, a carriage structure for supporting said mechanisms and including side members slidably mounted on the frame for opposite endwise movements with respect thereto, a gear rack formed on one of said side members, a gear carried on the frame for engagement with said rack, and a hand lever for actuating said gear to move said side members in opposite directions.

12. In an apparatus of the character described, a frame supported for positive movement in one direction to any one of a plurality of feed means, a parting mechanism, a transfer mechanism, a carriage supporting the parting and transfer mechanisms, means slidably supporting the carriage on the frame for movement thereon in opposite directions, and means for limiting such movement in one direction.

13. In an apparatus of the character described, a series of grid panel curing conveyors having delivery ends extending in a common direction, a frame supported for movement transversely with respect to said delivery ends of the conveyors, a parting mechanism on the frame, a transfer mechanism comprising power operated disks adapted to transfer grid panels from any selected conveyor and movable into operative position with respect to a selected conveyor by movement of said frame, a carriage slidably supporting the said transfer and parting mechanisms on the frame for movement toward and away from the delivery ends of the conveyors whereby said transfer disks may be retracted from said operative positions as the frame is adjusted to align them with another conveyor, and means for limiting movement of the carriage in the direction of the conveyors and for releasably locking the carriage with the disks in the proper operative position with respect to a selected conveyor.

14. In an apparatus of the character described, a frame, a series of curing conveyors extending in a common direction, said frame being supported for movement to selective positions adjacent any one of said curing conveyors, a transfer mechanism and a parting mechanism, a carriage structure for supporting said mechanisms and including side members slidably mounted on the frame for opposite endwise movements with respect thereto, a gear rack formed on one of said side members, a gear carried on the frame for engagement with said rack, a hand lever for actuating said gear to move said side members in opposite directions, and means for limiting movement of the hand lever in one direction and for locking the lever in a selected position.

CARL L. FELDTKELLER.